United States Patent
Kusumoto et al.

(10) Patent No.: US 12,199,243 B2
(45) Date of Patent: Jan. 14, 2025

(54) NON-AQUEOUS ELECTROLYTE SECONDARY BATTERY

(71) Applicant: Panasonic Intellectual Property Management Co., Ltd., Osaka (JP)

(72) Inventors: Yasuyuki Kusumoto, Hyogo (JP); Atsushi Fukui, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 628 days.

(21) Appl. No.: 17/435,551

(22) PCT Filed: Jan. 15, 2020

(86) PCT No.: PCT/JP2020/000983
§ 371 (c)(1),
(2) Date: Sep. 1, 2021

(87) PCT Pub. No.: WO2020/183894
PCT Pub. Date: Sep. 17, 2020

(65) Prior Publication Data
US 2022/0045364 A1 Feb. 10, 2022

(30) Foreign Application Priority Data
Mar. 11, 2019 (JP) ................... 2019-043540

(51) Int. Cl.
*H01M 10/0569* (2010.01)
(52) U.S. Cl.
CPC ........... *H01M 10/0569* (2013.01); *H01M 2300/0034* (2013.01); *H01M 2300/0051* (2013.01)

(58) Field of Classification Search
CPC .................................. H01M 10/0569
See application file for complete search history.

(56) References Cited

U.S. PATENT DOCUMENTS

| 2010/0081062 A1 | 4/2010 | Chiga et al. |
| 2015/0147644 A1 | 5/2015 | Kinoshita et al. |
| | (Continued) | |

FOREIGN PATENT DOCUMENTS

| JP | 8-298134 A | 11/1996 |
| JP | 2009-289414 A | 12/2009 |
| | (Continued) | |

OTHER PUBLICATIONS

International Search Report dated Mar. 24, 2020, issued in counterpart International Application No. PCT/JP2020/000983 (3 pages).

*Primary Examiner* — Karie O'Neill Apicella
(74) *Attorney, Agent, or Firm* — WHDA, LLP

(57) ABSTRACT

This non-aqueous electrolyte secondary battery comprises: an electrode assembly including a positive electrode, a negative electrode, and a separator; and a non-aqueous electrolyte including a non-aqueous solvent and an electrolyte salt dissolved in the non-aqueous solvent. The non-aqueous electrolyte contains a fluorine-containing chain carboxylic acid ester represented by formula 1 and a trifluoroethanol. The fluorine-containing chain carboxylic acid ester is contained in an amount of at least 10 vol % with respect to the volume of the non-aqueous electrolyte excluding the electrolyte salt, and the trifluoroethanol is contained in an amount of 0.1-2 mass % with respect to the mass of the fluorine-containing chain carboxylic acid ester. [Formula 1] $RCOOCH_2CF_3$, wherein R is a C2 or lower alkyl group, or a fluoroalkyl group.

11 Claims, 1 Drawing Sheet

(56) References Cited

U.S. PATENT DOCUMENTS

| | | | |
|---|---|---|---|
| 2017/0187068 A1 | 6/2017 | Morisawa et al. | |
| 2018/0205087 A1* | 7/2018 | Ishikawa | H01M 4/1315 |
| 2018/0241086 A1 | 8/2018 | Arthur et al. | |
| 2019/0221889 A1 | 7/2019 | Chiga et al. | |
| 2019/0312262 A1* | 10/2019 | Morisawa | H01M 4/505 |

FOREIGN PATENT DOCUMENTS

| | | | | |
|---|---|---|---|---|
| JP | 2015-128044 A | 7/2015 | | |
| JP | 2017-120765 A | 7/2017 | | |
| JP | 2018-530858 A | 10/2018 | | |
| KR | 1020140038676 A * | 3/2014 | | H01M 10/052 |
| WO | 2018/061301 A1 | 4/2018 | | |
| WO | 2018/123213 A1 | 7/2018 | | |

\* cited by examiner

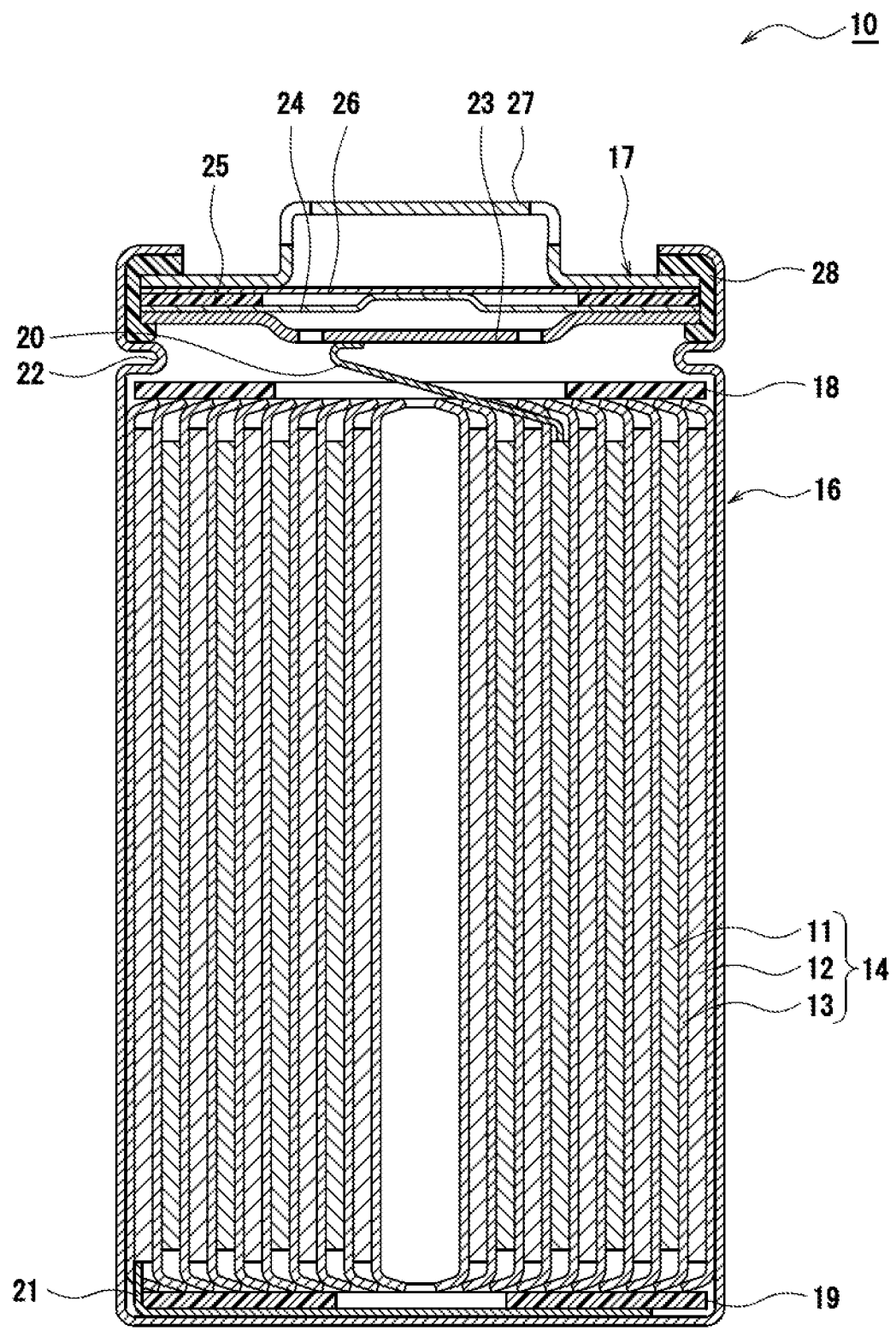

NON-AQUEOUS ELECTROLYTE SECONDARY BATTERY

TECHNICAL FIELD

The present disclosure relates to non-aqueous electrolyte secondary batteries.

BACKGROUND

Non-aqueous electrolyte secondary batteries including an electrode assembly including a positive electrode, a negative electrode, and separator, and a non-aqueous electrolyte containing a non-aqueous solvent, that is, a fluorine-containing compound, and an electrolyte salt dissolved in the non-aqueous solvent, have been widely known. Patent Document 1, for example, discloses a non-aqueous electrolyte secondary battery including, as a non-aqueous solvent, a specific fluorine-containing chain ester. Patent Document 1 discloses advantages in that deposition of metal to the negative electrode in the form of dendrite is prevented to increase safety and reliability of the battery.

CITATION LIST

Patent Literature

PATENT LITERATURE 1: Japanese Patent No. H08-298134

SUMMARY

It is necessary to stabilize the battery state after assembly of a non-aqueous electrolyte secondary battery such as a lithium ion battery, through finishing processes including preliminary charge, room temperature standing, finish charge/discharge, and aging, for example. The open circuit voltage (OCV) of a battery significantly varies immediately after assembly of the battery, requiring a long time period for the finishing processes.

It is an object of the disclosure to provide a non-aqueous electrolyte secondary battery with small OCV variation, thus allowing production with shortened finishing process.

In accordance with an aspect of the disclosure, a non-aqueous electrolyte secondary battery includes an electrode assembly including a positive electrode, a negative electrode, and a separator, and a non-aqueous electrolyte including a non-aqueous solvent, and an electrolyte salt dissolved in the non-aqueous solvent, wherein the non-aqueous electrolyte contains fluorine-containing chain carboxylic acid ester represented by Formula 1 described below, and trifluoroethanol. The fluorine-containing chain carboxylic acid ester is contained in an amount of 10 vol % or more with respect to a volume of the non-aqueous electrolyte excluding the electrolyte salt, and the trifluoroethanol is contained in an amount of 0.1 to 2 mass % with respect to a mass of the fluorine-containing chain carboxylic acid ester,

[Formula 1] $RCOOCH_2CF_3$, where R is an alkyl group having a carbon number of 2 or less, or a fluoroalkyl group.

In the non-aqueous electrolyte secondary battery according to an embodiment of the disclosure, OCV variations are small and the finishing processes can be shortened.

BRIEF DESCRIPTION OF DRAWINGS

FIG. 1 is a cross sectional view of a non-aqueous electrolyte secondary battery according to an example embodiment.

DESCRIPTION OF EMBODIMENTS

As described above, for non-aqueous electrolyte secondary batteries such as lithium ion batteries, the finishing processes including preliminary charge, room temperature standing, finish charge/discharge, and aging, for example, are performed to stabilize the battery state. If variation of the OCV and the internal resistance, for example, are small during the finishing processes, the battery state can be stabilized in a short time and the finishing processes can be shortened. There is therefore a demand for reducing the OCV variation and the internal resistance, for example. The present inventors have diligently studied to achieve this object and found that use of a specific amount of fluorine-containing chain carboxylic acid ester represented by the above Formula 1 and a specific amount of trifluoroethanol, as components of the non-aqueous electrolyte, would specifically reduce the OCV variation and the internal resistance.

It is considered that the effect of ion conductivity of the non-aqueous electrolyte on the electrode assembly is one of factors that make the OCV of a battery unstable. In the non-aqueous electrolyte secondary battery according to the present disclosure, it is assumed that an interaction between fluorine-containing chain carboxylic acid ester and trifluoroethanol forms a high-quality coating on a surface of the electrodes, thereby enhancing the ion conductivity of the electrode surface with respect to the non-aqueous electrolyte. It is therefore assumed that this configuration facilitates reaction of the non-aqueous electrolyte with the interior of the electrode assembly, thereby stabilizing the OCV.

During the finishing processes of a non-aqueous electrolyte secondary battery, typically, preliminary charge is first performed to form a protective coating called SEI on a surface of the negative electrode. The battery is then made to stand at room temperatures to stabilize the protective coating. Thereafter, finish charge/discharge is performed to form a coating on a surface of the positive electrode, and then the battery is made to stand at a higher temperature to stabilize the coatings on the positive and negative electrodes. Subsequently, first charge/discharge is performed to test the predetermined performances such as the initial discharge capacity, and an aging process is performed by allowing the battery to stand in a predetermined charged state for a predetermine time period. This series of finishing processes stabilizes the battery state. In the non-aqueous electrolyte secondary battery according to the disclosure, variations of the OCV, for example, are reduced during the finishing processes, allowing shortening of the finishing processes.

An example embodiment of a non-aqueous electrolyte secondary battery according to the present disclosure will be described in detail below. While in the following description, a cylindrical battery including a wound electrode assembly 14 housed in an exterior can 16 having a cylindrical shape with a closed bottom is described as an example, the exterior structure is not limited to a cylindrical exterior can. For example, the exterior structure may be a rectangular exterior can or may be composed of a laminate sheet as used in examples which will be described below. The electrode assembly may be a laminated electrode assembly that includes a plurality of positive electrodes and a plurality of negative electrodes alternately laminated with a separator between the positive and negative electrodes.

FIG. 1 is a cross-sectional view of a non-aqueous electrolyte secondary battery 10 according to an example embodiment. As illustrated in FIG. 1, the non-aqueous electrolyte secondary battery 10 includes an electrode assembly 14, a non-aqueous electrolyte, and an exterior can 16 that receives the electrode assembly 14 and the non-aqueous electrolyte. The electrode assembly 14 includes a positive electrode 11, a negative electrode 12, and a separator 13, and has a wound configuration in which the positive electrode 11 and the negative electrode 12 are wound with the separator 13 therebetween. The exterior can 16 is a metal container having a cylindrical shape with a closed bottom, and an opening of the exterior can 16 is closed with a sealing structure 17. In the following description, for ease of description, a direction toward the sealing structure 17 of the non-aqueous electrolyte secondary battery 10 indicates upward, and a direction toward the bottom of the exterior can 16 indicates downward.

The positive electrode 11, the negative electrode 12, and the separator 13 of the electrode assembly 14 are long strips of material that are laminated alternately in the radial direction of the electrode assembly 14 as they are spirally wound. The electrode assembly 14 includes a positive electrode lead 20 connected to the positive electrode 11 by, for example, welding, and a negative electrode lead 21 connected to the negative electrode 12 by, for example, welding. To prevent precipitation of lithium, the negative electrode 12 has a size slightly larger than the positive electrode 11. More specifically, the negative electrode 12 has greater lengths than the positive electrode 11 both in the length direction and in the width direction (shorter length direction). The separator 13 has a size slightly larger than at least the positive electrode 11 and two separators 13 are disposed to sandwich the positive electrode 11 therebetween, for example.

The non-aqueous electrolyte secondary battery 10 includes insulating plates 18 and 19 respectively disposed on top and bottom of the electrode assembly 14. In the example illustrated in FIG. 1, the positive electrode lead 20 attached to the positive electrode 11 extends through a through hole in the insulating plate 18 toward the sealing structure 17, and the negative electrode lead 21 attached to the negative electrode 12 passes external to the insulating plate 19 and extends toward the bottom of the exterior can 16. The positive electrode lead 20 is connected to an underside of an internal terminal plate 23 of the sealing structure 17 by, for example, welding, and a cap 27 that is a top plate of the sealing structure 17 electrically connected to the internal terminal plate 23 serves as a positive electrode terminal. The negative electrode lead 21 is connected to an inner surface of the bottom of the exterior can 16 by, for example, welding, and the exterior can 16 serves as a negative electrode terminal.

A gasket 28 is disposed between the exterior can 16 and the sealing structure 17, thereby maintaining airtightness of the interior of the battery. The exterior can 16 has a grooved portion 22, which is an inwardly protruding portion of the side surface of the exterior can 16, and the grooved portion 22 supports the sealing structure 17. The grooved portion 22 preferably has an annular shape extending along the circumference of the exterior can 16, and supports the sealing structure 17 on its upper surface. The sealing structure 17 is fixed to an upper portion of the exterior can 16 via the grooved portion 22 and an opening edge portion of the exterior can 16 that is swaged to the sealing structure 17.

The sealing structure 17 includes the internal terminal plate 23, a lower valve element 24, an insulating member 25, an upper valve element 26, and the cap 27 that are stacked in sequence from the side closer to the electrode assembly 14 to thereby form a laminate structure. The components of the sealing structure 17 have, for example, either a disc shape or a ring shape and are, except for the insulating member 25, electrically connected to each other. The lower valve element 24 and the upper valve element 26 are connected to each other at their center portions, and the insulating member 25 is interposed between their peripheral portions. In response to an increase in the internal pressure of the battery due to abnormal heat generation, the lower valve element 24 deforms to push the upper valve element 26 toward the cap 27 and breaks, thereby interrupting the current path between the lower valve element 24 and the upper valve element 26. In response to a further increase in the internal pressure, the upper valve element 26 breaks, letting gas escape through an opening of the cap 27.

The positive electrode 11, the negative electrode 12, the separator 13, and the non-aqueous electrolyte, particularly the non-aqueous electrolyte, will be described in detail below.

[Positive Electrode]

The positive electrode 11 includes a positive electrode core and a positive electrode mixture layer that is disposed on a surface of the positive electrode core. Examples of the positive electrode core include foil of metal that is stable in a potential range of the positive electrode 11, such as aluminum, and a film having such metal disposed on its surface layer. The positive electrode mixture layer preferably contains, for example, a positive electrode active material, a conductive material, and a binder, and is disposed on each of opposite surfaces of the positive electrode core except for a portion to which the positive electrode lead 20 is connected. The positive electrode 11 can be prepared by, for example, applying positive electrode mixture slurry containing, for example, a positive electrode active material, a binder, and a conductive material, to surfaces of the positive electrode core and drying and then compressing the coating, to form the positive electrode mixture layer on both the opposite sides of the positive electrode core.

The positive electrode active material contains a lithium-containing transition metal composite oxide as a primary component. Example metal elements contained in the lithium-containing transition metal composite oxide include Ni, Co, Mn, Al, B, Mg, Ti, V, Cr, Fe, Cu, Zn, Ga, Sr, Zr, Nb, In, Sn, Ta, and W for example. A preferred example of the lithium-containing transition metal composite oxide includes a composite oxide containing at least one of Ni, Co, or Mn; specific examples include a lithium-containing transition metal composite oxide containing Ni, Co, and Mn and a lithium-containing transition metal composite oxide containing Ni, Co, and Al.

Examples of the conductive material contained in the positive electrode mixture layer include carbon materials such as carbon black, acetylene black, Ketjenblack. and graphite. Examples of the binder contained in the positive electrode mixture layer include fluoro-resins such as polytetrafluoroethylene (PTFE) and polyvinylidene fluoride (PVdF), polyacrylonitrile (PAN), polyimide resins, acrylic resins, and polyolefin resins. These resins may be used with a cellulose derivative such as carboxymethyl cellulose (CMC) or its salt, or polyethylene oxide (PEO).

[Negative Electrode]

The negative electrode 12 includes a negative electrode core and a negative electrode mixture layer that is disposed on a surface of the negative electrode core. Examples of the negative electrode core include foil of metal that is stable in a potential range of the negative electrode 12, such as copper, and a film having such metal disposed on its surface layer. The negative electrode mixture layer preferably contains, for example, a negative electrode active material and a binder, and is disposed on each of opposite surfaces of the negative electrode core except for a portion to which the negative electrode lead 21 is connected. The negative electrode 12 can be prepared by, for example, applying negative electrode mixture slurry containing, for example, a negative electrode active material and a binder, to surfaces of the negative electrode core and drying and then compressing the coating, to form the negative electrode mixture layer on both the opposite sides of the negative electrode core.

The negative electrode mixture layer contains, as the negative electrode active material, a carbon-based active material that reversibly occludes and releases lithium ions, for example. The carbon-based active material is preferably graphite including natural graphite such as flake graphite, massive graphite, and earthy graphite, and artificial graphite such as massive artificial graphite (MAG) and graphitized mesophase carbon microbeads (MCMB). As the negative electrode active material, an Si-based active material that is composed of at least one of Si or an Si-containing compound may be used, and a carbon-based active material and an Si-based active material may be used in combination.

Similar to the binder in the positive electrode 20, examples of the binder contained in the negative electrode mixture layer include fluoro-resins, PAN, polyimide resins, acrylic resins, and polyolefin resins, and styrene-butadiene rubber (SBR) is preferably used. The negative electrode mixture layer preferably further contains, for example, CMC or a salt thereof, polyacrylic acid (PAA) or a salt thereof, or polyvinyl alcohol (PVA). It is particularly preferable to use SBR in combination with CMC or a salt thereof and PAA or a salt thereof.

[Separator]

The separator 13 is an ion-permeable and insulating porous sheet, for example. Examples of the porous sheet include a microporous thin film, woven fabric, and nonwoven fabric. Suitable examples of materials for the separator 13 include olefin resins such as polyethylene and polypropylenes and cellulose. The separator 13 may have either a single-layer structure or a multilayer structure. The separator 13 may include, on its surface, a heat-resistant layer, for example.

[Non-Aqueous Electrolyte]

The non-aqueous electrolyte includes a non-aqueous solvent and an electrolyte salt dissolved in the non-aqueous solvent. The non-aqueous electrolyte is not limited to a liquid electrolyte (non-aqueous electrolyte solution) and may be a solid electrolyte. The non-aqueous electrolyte contains, as a non-aqueous solvent, fluorine-containing chain carboxylic acid ester (hereinafter abbreviated as "FCAE") represented by the following Formula 1. FCAE is contained in an amount of 10 vol % or more with respect to the volume of the non-aqueous electrolyte excluding the electrolyte salt

$$RCOOCH_2CF_3 \quad \text{[Formula 1]}$$

where R is an alkyl group having a carbon number of 2 or less or a fluoroalkyl group, and is preferably a fluoroalkyl group having a carbon number of 2 or less.

The non-aqueous electrolyte further contains trifluoroethanol (TFE). TFE is contained in an amount of 0.1 to 2 mass %, and more preferably 0.1 to 0.5 mass %, with respect to the mass of FCAE. Use of a non-aqueous electrolyte containing specific amounts of FCAE and TFE enables stabilization of the open circuit voltage (OCV) of a battery within a desired range to thus reduce OCV variation. It is considered that the OCV is stabilized by an interaction between FCAE and TFE to enhance the ion conductivity between the electrode assembly 14 and the non-aqueous electrolyte, thereby making the state of the electrode assembly 14 uniform.

FCAE is ethyl fluoroacetate, ethyl fluoropropionate, and mixtures of two or more of these. Examples of ethyl fluoroacetate include acetic acid-2,2,2-trifluoroethyl (FCAE3), where R in [Formula 1] is an alkyl group having a carbon number of 1, difluoroacetic acid-2,2,2-trifluoroethyl (FCAE1), where R is a fluoroalkyl group having a carbon number of 1, and trifluoroacetic acid-2,2,2-trifluoroethyl. Examples of ethyl fluoropropionate include propionic acid-2,2,2-trifluoroethyl, where R is an alkyl group having a carbon number of 2, 2,2-difluoropropionic acid-2,2,2-trifluoroethyl, where R is a fluoroalkyl group having a carbon number of 2, and 2,2,2-trifluoropropionic acid-2,2,2-trifluoroethyl (FCAE2), for example.

Examples of preferable FCAE include difluoroacetic acid-2,2,2-trifluoroethyl (FCAE1), 2,2,2-trifluoropropionic acid-2,2,2 trifluoroethyl (FCAE2), and acetic acid-2,2,2-trifluoroethyl(FCAE3). In particular, FCAE1 and FCAE2, where R in [Formula 1] is a fluoroalkyl group having a carbon number of 2 or less are preferred.

The content of FCAE is at least 10 vol %, preferably 30 vol % or more, more preferably 40 vol % or more, and particularly preferably 50 vol % or more, with respect to the volume of the non-aqueous electrolyte excluding the electrolyte salt. While, in terms of stability of the OCV, FCAE may be contained in the entire amount of the non-aqueous solvent, the content of FCAE is preferably 10 to 95 mass % in consideration of other battery performances such as cyclic properties. Examples of other non-aqueous solvents include, for example, ethers, esters other than FCAE, nitriles such as acetonitrile, amides such as dimethylformamide, and mixture solvents of two or more of these.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, 1,2-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Examples of the esters include cyclic carbonate esters such as ethylene carbonate (EC), propylene carbonate (PC), and butylene carbonate, chain carbonate esters such as dimethyl carbonate (DMC), ethyl methyl carbonate (EMC), diethyl carbonate (DEC), methyl propyl carbonate, ethyl propyl carbonate, and methyl isopropyl carbonate, cyclic carboxylate esters such as γ-butyrolactone and γ-valerolactone, and chain carboxylate esters such as methyl acetate, ethyl acetate, propyl acetate, methyl propionate (MP), ethyl propionate, and γ-butyrolactone.

The non-aqueous solvent may be fluorine-containing cyclic carbonate esters such as fluoroethylene carbonate (FEC), fluorine-containing chain carbonate esters, methyl fluoropropionate (FMP), and fluorine-containing chain carboxylic acid esters other than FCAE. The non-aqueous electrolyte may contain FEC in the amount of 5 to 40 vol % with respect to the volume of the non-aqueous electrolyte excluding the electrolyte salt, for example. The non-aqueous electrolyte may also contain FMP in the amount of 10 to 90 vol % with respect to the volume of the non-aqueous electrolyte excluding electrolyte salt. While the content of each of FEC and FMP may be greater than the content of FCAE, it is preferable, in terms of stabilization of the OCV, that the content FMP is smaller than the content of FCAE and that the total content of FEC and FMP is smaller than the content of FCAE. The content of FMP is preferably 10 to 30 vol % with respect to the volume of the non-aqueous electrolyte excluding the electrolyte salt, for example.

Examples of FEC include 4-fluoroethylene carbonate (monofluoroethylene carbonate), 4,5-difluoroethylene carbonate, 4,4-difluoroethylene carbonate, 4,4,5-trifluoroethylene carbonate, and 4,4,5,5-tetrafluoroethylene carbonate, among which 4-fluoroethylene carbonate is particularly preferred. Examples of FMP include methyl 3,3,3-trifluoropropionate.

TFE is an additive that stabilizes, with FCAE, the OCV of the battery, and is 2,2,2-trifluoroethanol represented by $CF_3CH_2OH$. TFE is miscible with a non-aqueous solvent such as FCAE. The non-aqueous electrolyte may be composed of only FCAE, TFE, and an electrolyte salt.

TFE is contained in the non-aqueous electrolyte in the amount of at least 0.1 mass % with respect to the mass of FCAE. The content of TFE that is less than 0.1 mass % with respect to the mass of FCAE would not provide an advantage of reducing OCV variation. Meanwhile, the upper limit of the content of TFE is 2 mass % with respect to the mass of FCAE. The content of TFE that is over 2 mass % with respect to the mass of FCAE would also not provide an advantage of reducing OCV variation. As such, only the limited range of the content of TFE, which is between 0.1 and 2 mass % with respect to FCAE, would specifically enhance stability of the OCV.

The electrolyte salt is preferably lithium salt. Examples of lithium salt include borates such as $LiBF_4$, $LiClO_4$, $LiPF_6$, $LiAsF_6$, $LiSbF_6$, $LiAlCl_4$, $LiSCN$, $LiCF_3SO_3$, $LiFSO_3$, $LiCF_3CO2$, $Li(P(C_2O_4)F_4)$, $LiPF_{6-x}(C_nF_{2n+1})_x$ (1<x<6, n is 1 or 2), $LiB_{10}Cl_{10}$, LiCl, LiBr, LiI, LiBCl, $Li_2B_4O_7$, $Li(B(C_2O_4)F_2)$, and imide salts such as $LiN(SO_2CF_3)_2$, $LiN(C_lF_{2l+1}SO_2)(C_mF_{2m+1}SO_2)$ where 1 and m are integer numbers of 1 or more, and $LiN(SO_2F)_2$. Among these, use of $LiPF_6$ or $LiN(SO_2F)_2$ is preferred in terms of ion conductivity and electrochemical stability, for example. A single type of these electrolyte salt may be used alone or a plurality of types of electrolyte salts may be combined. The concentration of the electrolyte salt is preferably 0.5 to 2.0 mol per 1 L of non-aqueous solvent.

EXAMPLES

The present disclosure will be further described below with reference to examples: however, the present disclosure is not limited to these examples.

Example 1

[Preparation of Positive Electrode]

As a positive electrode active material, a lithium-containing transition metal composite oxide containing Ni, Co, and Mn was used. Specifically, 98 parts by mass of positive electrode active material, 1 part of mass of acetylene black, and 1 part by mass of polyvinylidene fluoride were mixed, and N-methyl-2-pyrrolidone (NMP) was added thereto as a dispersion medium, to prepare positive electrode mixture slurry Subsequently, the positive electrode mixture slurry was applied onto each of opposite surfaces of a positive electrode core formed of an aluminum foil having a thickness of 15 μm. After drying and compressing the coating, the resultant product was cut into a predetermined electrode size, thereby forming a positive electrode having a positive electrode mixture layer on each of the opposite surfaces of the positive electrode core.

[Preparation of Negative Electrode]

As a negative electrode active material, graphite powder was used. Specifically, 100 parts by mass of negative electrode active material, 1 part of mass of sodium carboxymethyl cellulose (CMC-Na), and 1 part by mass of styrene-butadiene rubber (SBR) were mixed, and water was added thereto as a dispersion medium, to prepare negative electrode mixture slurry. Subsequently, the negative electrode mixture slurry was applied onto each of opposite surfaces of a negative electrode core formed of a copper foil. After drying and compressing the coating, the resultant product was cut into a predetermined electrode size, thereby forming a negative electrode having a negative electrode mixture layer on each of the opposite surfaces of the negative electrode core.

[Preparation of Non-Aqueous Electrolyte Solution]

A non-aqueous solvent was formed by mixing 4-fluoroethylene carbonate (FEC) and difluoroacetic acid-2,2,2-trifluoroethyl (FCAE1) in a volume ratio of 15:85, and $LiPF_6$ was dissolved in the non-aqueous solvent in a concentration of 1M. Then, trifluoroethanol (TFE) was further added to this mixture solvent in an amount of 0.1% by mass with respect to FCAE1 to prepare a non-aqueous electrolyte solution.

[Preparation of Battery]

The above-described positive electrode to which an aluminum positive electrode lead was attached and the above-described negative electrode to which a nickel negative electrode lead was attached were spirally wound with a polyethylene separator therebetween and were then molded into a flat shape to prepare a wound electrode assembly. This electrode assembly was placed in an exterior structure composed of an aluminum laminate, and after filling the inside of the exterior structure with the above-described non-aqueous electrolyte solution, the opening of the exterior structure was sealed to produce a non-aqueous electrolyte secondary battery.

Example 2

A non-aqueous electrolyte secondary battery was prepared in a manner similar to Example 1 except that, in formulating the non-aqueous electrolyte solution, TFE was added in an amount of 0.2 mass %.

Example 3

A non-aqueous electrolyte secondary battery was prepared in a manner similar to Example 1 except that, in formulating the non-aqueous electrolyte solution, TFE was added in an amount of 2.0 mass %.

Example 4

A non-aqueous electrolyte secondary battery was prepared in a manner similar to Example 2 except that, in formulating the non-aqueous electrolyte solution, 2,2,2-trifluoropropionic acid-2,2,2-trifluoroethyl (FCAE2) was used in place of FCAE1.

Example 5

Anon-aqueous electrolyte secondary battery was prepared in a manner similar to Example 2 except that, in formulating the non-aqueous electrolyte solution, acetic acid-2,2,2-trifluoroethyl (FCAE3) was used in place of FCAE1.

Example 6

A non-aqueous electrolyte secondary battery was prepared in a manner similar to Example 2 except that, in formulating the non-aqueous electrolyte solution, the amount of FCAE1 was reduced by 10 vol % and 3,3,3-trifluoropropionic acid methyl (FMP) was added to the concentration of 10 vol % (with respect to the volume of the non-aqueous electrolyte excluding the electrolyte salt).

Example 7

A non-aqueous electrolyte secondary battery was prepared in a manner similar to Example 2 except that, in formulating the non-aqueous electrolyte solution, the amount of FCAE1 was reduced by 20 vol % and FMP was added to the concentration of 20 vol %.

Example 8

A non-aqueous electrolyte secondary battery was prepared in a manner similar to Example 2 except that, in formulating the non-aqueous electrolyte solution, the amount of FCAE1 was reduced by 30 vol % and FMP was added to the concentration of 30 vol %.

Comparative Example 1

A cylindrical non-aqueous electrolyte secondary battery was prepared in a manner similar to Example 1 except that, in formulating the non-aqueous electrolyte solution. TFE was not added.

Comparative Example 2

Anon-aqueous electrolyte secondary battery was prepared in a manner similar to Example 1 except that, in formulating the non-aqueous electrolyte solution, TFE was added in an amount of 0.01 mass %.

Comparative Example 3

A cylindrical non-aqueous electrolyte secondary battery was prepared in a manner similar to Example 4 except that, in formulating the non-aqueous electrolyte solution, TFE was not added.

Comparative Example 4

A cylindrical non-aqueous electrolyte secondary battery was prepared in a manner similar to Example 5 except that, in formulating the non-aqueous electrolyte solution. TFE was not added.

[Evaluation of OCV Variation]

For the batteries in Examples and Comparative Examples, ten batteries were prepared for each example, and, after preliminary charge, the batteries were left to stand at room temperatures for three days. After the standing, OCV values of the batteries were measured, and differences between the maximum and minimum OCV values were evaluated as OCV variations. Further, finish charge/discharge was performed for the batteries whose OCV values were measured, and differences between the maximum and minimum OCV values were evaluated as OCV variations. In the preliminary charge, the batteries were charged to 60 mAh after preparation. In the finish charge/discharge, after charging to 4.0 V the batteries were discharged to 3.0 V.

TABLE 1

| | Non-aqueous Solvent | | | Battery Performance Evaluation OCV Variation (mV) | |
|---|---|---|---|---|---|
| | FCAE | FMP Content | TFE Content | After Preliminary Charge + Standing | After Finish Charge/Discharge |
| Example 1 | FCAE1 | — | 0.1% | 4 | 0 |
| Example 2 | FCAE1 | — | 0.2% | 3 | 0 |
| Example 3 | FCAE1 | — | 2.0% | 8 | 1 |
| Example 4 | FCAE2 | — | 0.2% | 4 | 1 |
| Example 5 | FCAE3 | — | 0.2% | 9 | 1 |
| Example 6 | FCAE1 | 10% | 0.2% | 2 | 0 |
| Example 7 | FCAE1 | 20% | 0.2% | 2 | 0 |
| Example 8 | FCAE1 | 30% | 0.2% | 2 | 0 |
| Comparative Example 1 | FCAE1 | — | — | 23 | 2 |
| Comparative Example 2 | FCAE1 | — | 0.01% | 21 | 2 |
| Comparative Example 3 | FCAE2 | — | — | 22 | 2 |
| Comparative Example 4 | FCAE3 | — | — | 25 | 3 |

As shown in TABLE 1, all of the batteries in Examples have less OCV variations than the batteries in Comparative Examples. Addition of FMP further enhances stability of OCV after preliminary charge and standing (see Examples 6 to 8).

REFERENCE SIGNS LIST 10 non-aqueous electrolyte secondary battery
11 positive electrode
12 negative electrode
13 separator
14 electrode assembly
16 exterior can
17 sealing structure
18, 19 insulating plate
20 positive electrode lead
21 negative electrode lead
22 grooved portion
23 internal terminal plate
24 lower valve element
25 insulating member
26 upper valve element
27 cap
28 gasket

The invention claimed is:

1. A non-aqueous electrolyte secondary battery, comprising:
   an electrode assembly including a positive electrode, a negative electrode, and a separator; and
   a non-aqueous electrolyte including a non-aqueous solvent, and an electrolyte salt dissolved in the non-aqueous solvent, wherein
   the non-aqueous electrolyte contains fluorine-containing chain carboxylic acid ester represented by Formula 1 described below, and trifluoroethanol,
   the fluorine-containing chain carboxylic acid ester is contained in an amount of 10 vol % or more with respect to a volume of the non-aqueous electrolyte excluding the electrolyte salt, and
   the trifluoroethanol is contained in an amount of 0.1 to 2 mass % with respect to a mass of the fluorine-containing chain carboxylic acid ester, $$RCOOCH_2CF_3 \qquad \text{[Formula 1]}$$

where R is a fluoroalkyl group having a carbon number of 2 or less.

2. The non-aqueous electrolyte secondary battery according to claim 1, wherein
   the fluorine-containing chain carboxylic acid ester comprises at least one of difluoroacetic acid-2, 2, 2-trifluoroethyl, 2, 2, 2-trifluoropropionic acid-2, 2, 2-trifluoroethyl, or acetic acid-2, 2, 2-trifluoroethyl.

3. The non-aqueous electrolyte secondary battery according to claim 1, wherein
   the non-aqueous electrolyte contains methyl fluoropropionate in an amount of 10 to 90 vol % with respect to a volume of the non-aqueous electrolyte excluding the electrolyte salt.

4. The non-aqueous electrolyte secondary battery according to claim 3, wherein
   the non-aqueous electrolyte contains the fluorine-containing chain carboxylic acid ester in an amount greater than an amount of the methyl fluoropropionate.

5. The non-aqueous electrolyte secondary battery according to claim 3, wherein
   the non-aqueous electrolyte further contains fluoroethylene carbonate, and
   the non-aqueous electrolyte contains the fluorine-containing chain carboxylic acid ester in an amount greater than a total content of the fluoroethylene carbonate and the methyl fluoropropionate.

6. The non-aqueous electrolyte secondary battery according to claim 1, wherein
   the trifluoroethanol is contained in an amount of 0.1 to 0.5 mass % with respect to a mass of the fluorine-containing chain carboxylic acid ester.

7. A non-aqueous electrolyte secondary battery, comprising:
   an electrode assembly including a positive electrode, a negative electrode, and a separator; and
   a non-aqueous electrolyte including a non-aqueous solvent, and an electrolyte salt dissolved in the non-aqueous solvent, wherein
   the non-aqueous electrolyte contains fluorine-containing chain carboxylic acid ester represented by Formula 1 described below, and trifluoroethanol,
   the fluorine-containing chain carboxylic acid ester is contained in an amount of 10 vol % or more with respect to a volume of the non-aqueous electrolyte excluding the electrolyte salt, and
   the trifluoroethanol is contained in an amount of 0.1 to 2 mass % with respect to a mass of the fluorine-containing chain carboxylic acid ester, $$RCOOCH_2CF_3 \qquad \text{[Formula 1]}$$

where R is an alkyl group having a carbon number of 2 or less, or a fluoroalkyl group,
   wherein the fluorine-containing chain carboxylic acid ester comprises at least one of difluoroacetic acid-2, 2, 2-trifluoroethyl, 2, 2, 2-trifluoropropionic acid-2, 2, 2-trifluoroethyl, or acetic acid-2, 2, 2-trifluoroethyl.

8. The non-aqueous electrolyte secondary battery according to claim 7, wherein
   the non-aqueous electrolyte contains methyl fluoropropionate in an amount of 10 to 90 vol % with respect to a volume of the non-aqueous electrolyte excluding the electrolyte salt.

9. The non-aqueous electrolyte secondary battery according to claim 8, wherein
   the non-aqueous electrolyte contains the fluorine-containing chain carboxylic acid ester in an amount greater than an amount of the methyl fluoropropionate.

10. The non-aqueous electrolyte secondary battery according to claim 8, wherein
    the non-aqueous electrolyte further contains fluoroethylene carbonate, and
    the non-aqueous electrolyte contains the fluorine-containing chain carboxylic acid ester in an amount greater than a total content of the fluoroethylene carbonate and the methyl fluoropropionate.

11. The non-aqueous electrolyte secondary battery according to claim 7, wherein
    the trifluoroethanol is contained in an amount of 0.1 to 0.5 mass % with respect to a mass of the fluorine-containing chain carboxylic acid ester.

* * * * *